(12) United States Patent
Ramaswamy (10) Patent No.: US 8,934,529 B2
(45) Date of Patent: Jan. 13, 2015

(54) METHOD AND APPARATUS FOR PROVIDING ROBUST RECEPTION IN A WIRELESS COMMUNICATIONS SYSTEM

(75) Inventor: Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1263 days.

(21) Appl. No.: 11/887,307

(22) PCT Filed: Oct. 19, 2005

(86) PCT No.: PCT/US2005/037467
§ 371 (c)(1),
(2), (4) Date: Sep. 27, 2007

(87) PCT Pub. No.: WO2006/104519
PCT Pub. Date: Oct. 5, 2006

(65) Prior Publication Data
US 2009/0284662 A1 Nov. 19, 2009

Related U.S. Application Data

(60) Provisional application No. 60/666,077, filed on Mar. 29, 2005.

(51) Int. Cl.
*H04N 5/40* (2006.01)
*H04N 7/173* (2011.01)
*H04N 5/445* (2011.01)
*H04N 5/50* (2006.01)
*H04H 20/28* (2008.01)
*H04H 20/20* (2008.01)
*H04H 60/11* (2008.01)
*H04N 21/2343* (2011.01)
*H04N 21/235* (2011.01)
*H04N 21/2365* (2011.01)
*H04N 21/2662* (2011.01)
*H04N 21/434* (2011.01)
*H04N 21/435* (2011.01)
*H04N 21/438* (2011.01)
*H04N 21/462* (2011.01)
*H04N 21/63* (2011.01)

(52) U.S. Cl.
CPC ............... *H04H 20/28* (2013.01); *H04H 20/20* (2013.01); *H04H 60/11* (2013.01); *H04H 5/4401* (2013.01); *H04N 21/234327* (2013.01); *H04N 21/235* (2013.01); *H04N 21/2365* (2013.01); *H04N 21/2662* (2013.01); *H04N 21/4347* (2013.01); *H04N 21/435* (2013.01); *H04N 21/4383* (2013.01); *H04N 21/4622* (2013.01); *H04N 21/631* (2013.01)
USPC .......................................................... 375/240

(58) Field of Classification Search
None
See application file for complete search history.

(56) References Cited

U.S. PATENT DOCUMENTS 5,142,690 A * 8/1992 McMullan et al. ........... 725/124
5,946,052 A 8/1999 Ozkan et al.
(Continued)

FOREIGN PATENT DOCUMENTS

JP 11146357 5/1999
JP 2001217735 8/2001
(Continued)

OTHER PUBLICATIONS

International Search Report, dated Mar. 27, 2006.

*Primary Examiner* — Hung Dang
*Assistant Examiner* — Sunghyoun Park
(74) *Attorney, Agent, or Firm* — Robert D. Shedd; Joseph J. Opalach (57) ABSTRACT

A transport stream for conveying a program for a particular channel includes an auxiliary channel, which conveys multiple lower resolution programs associated with other channels. When a receiver has difficulty receiving a particular channel due to the geographical location of the receiver, the receiver tunes to a stronger signal associated with another channel and recovers a lower resolution version of the desired program from the auxiliary channel conveyed therein.

8 Claims, 9 Drawing Sheets

(56) References Cited

U.S. PATENT DOCUMENTS

| | | | |
|---|---|---|---|
| 6,366,326 B1 | 4/2002 | Ozkan et al. | |
| 6,535,717 B1* | 3/2003 | Matsushima et al. | 455/18 |
| 7,197,070 B1* | 3/2007 | Zhang et al. | 375/240.01 |
| 2001/0017891 A1 | 8/2001 | Boyce et al. | |
| 2002/0028680 A1 | 3/2002 | Jenkins et al. | |
| 2002/0058475 A1* | 5/2002 | Patsiokas | 455/3.02 |
| 2002/0120926 A1* | 8/2002 | Yun | 725/22 |
| 2002/0138851 A1* | 9/2002 | Lord et al. | 725/133 |
| 2002/0151311 A1* | 10/2002 | Miyoshi et al. | 455/452 |
| 2003/0014752 A1 | 1/2003 | Zaslavsky et al. | |
| 2004/0101274 A1* | 5/2004 | Foisy et al. | 386/46 |
| 2005/0024543 A1 | 2/2005 | Ramaswamy et al. | |
| 2006/0069550 A1* | 3/2006 | Todd et al. | 704/212 |
| 2006/0120378 A1* | 6/2006 | Usuki et al. | 370/395.4 |
| 2007/0147804 A1* | 6/2007 | Zhang et al. | 386/131 |

FOREIGN PATENT DOCUMENTS

| | | |
|---|---|---|
| JP | 2002-176594 | 6/2002 |
| JP | 2002300129 | 10/2002 |
| JP | 2004-312489 | 11/2004 |
| WO | WO0078039 | 12/2000 |

* cited by examiner

METHOD AND APPARATUS FOR PROVIDING ROBUST RECEPTION IN A WIRELESS COMMUNICATIONS SYSTEM

CROSS-REFERENCE TO RELATED APPLICATIONS

This application claims the benefit, under 35 U.S.C. §365 of International Application PCT/US2005/037467 filed Oct. 19, 2005, which was published in accordance with PCT Article 21(2) on Oct. 5, 2006 in English and claims priority of U.S. Provisional patent application No. 60/666,077 filed Mar. 29, 2005.

BACKGROUND OF THE INVENTION

The present invention generally relates to communications systems and, more particularly, to wireless systems, e.g., terrestrial broadcast, cellular, Wireless-Fidelity (Wi-Fi), satellite, etc.

Figure 1:
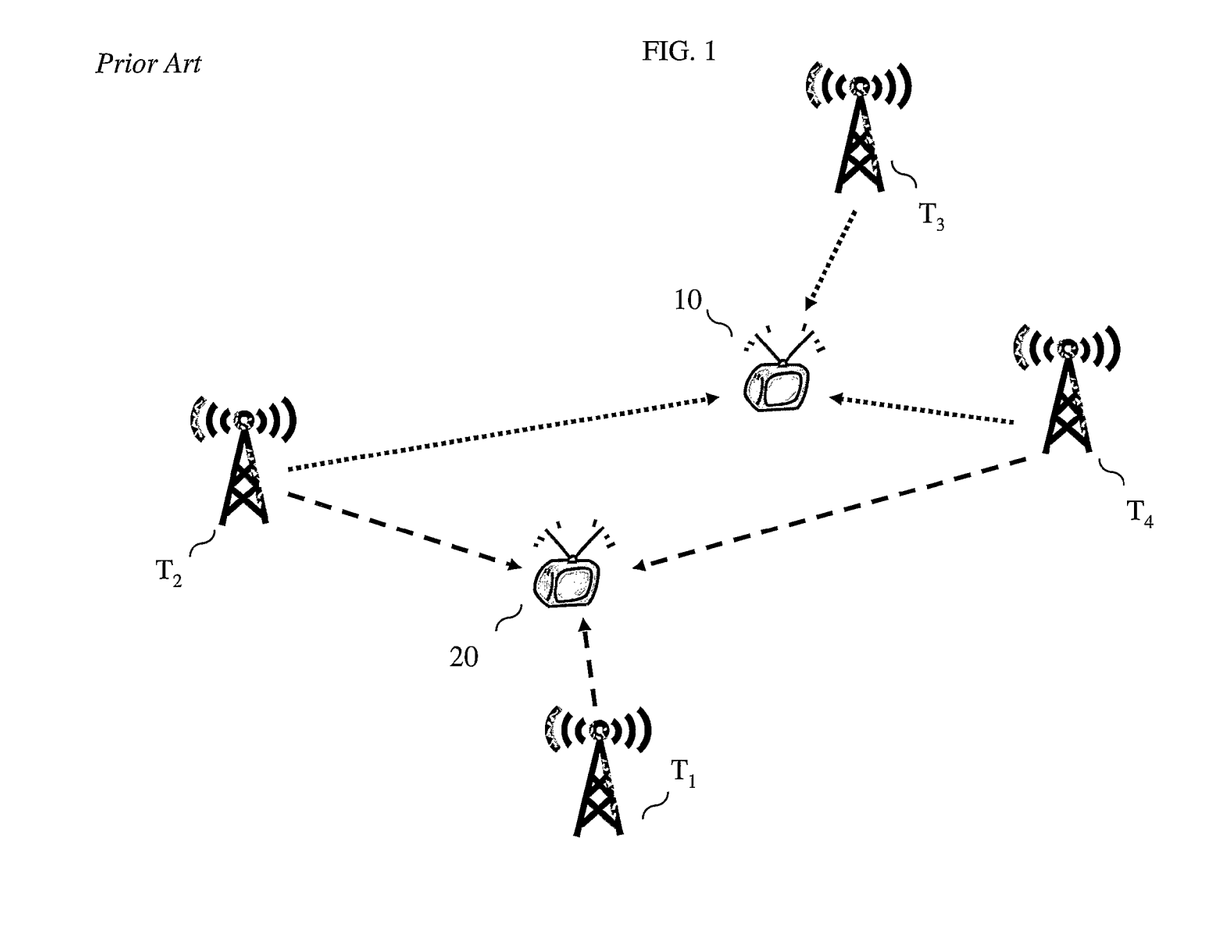
FIG. 1 illustrates reception problems in a terrestrial television broadcast areas.

In many wireless communications systems, the key problem is that a receiver may be able to receive the transmission of some of the channels (or signals) but not all of them. For example, in a terrestrial broadcast television (TV) system in the United States, a city may typically have 5 to 15 terrestrial transmitters that are geographically separated, each terrestrial transmitter broadcasting content on a particular channel (or channels). However, a TV set may only be able to receive a subset of the channels being broadcast in a given geographical area because of the geographical location of the TV set. Indeed, for a modern digital communication system like the ATSC-DTV (Advanced Television Systems Committee-Digital Television) system (e.g., see, United States Advanced Television Systems Committee, "ATSC Digital Television Standard", Document A/53, Sep. 16, 1995 and "Guide to the Use of the ATSC Digital Television Standard", Document A/54, Oct. 4, 1995), it is well known that the coverage for a given area varies depending on the location of the TV set. This is further illustrated in FIG. 1. A geographical area includes terrestrial ATSC-DTV transmission towers $T_1$, $T_2$, $T_3$ and $T_4$, for broadcasting content associated with channels 1, 2, 3 and 4, respectively. (For the purposes of this example, it is assumed that each transmission tower only broadcasts programming for a single channel.) In this geographical area, two TV sets, TV set 10 and TV set 20, are located. As illustrated in FIG. 1 by the dotted lines arrows, TV set 10 is only able to receive a subset of the available channels, i.e., channels 2, 3 and 4. Likewise, the dashed line arrows of FIG. 1 illustrate that TV set 20 is only able to receive channels 1, 2 and 4.

There is no solution today that can mitigate this problem.

SUMMARY OF THE INVENTION

At present, an ATSC-DTV system offers about 19 Mbits/sec (millions of bits per second) for transmission of an MPEG2-compressed HDTV (high definition TV) signal (MPEG2 refers to Moving Picture Expert Group (MPEG)-2 Systems Standard (ISO/IEC 13818-1)). As such, around four to six standard definition TV channels can be safely supported in a single physical transmission channel (PTC) without congestion. Additionally, enough bandwidth remains within this transport stream to provide several additional low-bandwidth non-conventional services such as weather reports, stock indices, headline news, home shopping, etc. In fact, due to improvements in both MPEG2 encoding and the introduction of advanced codec (coder/decoder) technology (such as H.264 or VC1), even more additional spare capacity is becoming available in a PTC.

I have observed that this spare capacity can be put to use to provide a method and apparatus for providing robust reception in a wireless communications system. In particular, and in accordance with the principles of the invention, a transport stream for conveying a program for a particular channel includes an auxiliary channel, which conveys multiple lower resolution programs associated with other channels. Thus, if a receiver has difficulty receiving a particular channel due to the location of the receiver, the receiver can tune to a stronger signal associated with another channel and recover a lower resolution version of the desired program from the auxiliary channel conveyed therein.

In an embodiment of the invention, an ATSC-DTV transmitter for a TV provider transmits a digital multiplex that includes a primary channel and an auxiliary channel. The primary channel includes one or more high definition TV (HDTV) channels offered by the TV provider; while the auxiliary channel rebroadcasts multiple lower resolution programs associated with channels broadcast by other ATSC-DTV transmitters.

In another embodiment of the invention, an ATSC-DTV receiver performs a method that provides for a more robust reception of terrestrial video signals. Illustratively, the ATSC-DTV receiver initially tunes to the PTC associated with the desired channel. If the ATSC-DTV receiver determines that no signal is available (e.g., an associated received signal strength indicator (RSSI) is below a predetermined value), then the ATSC-DTV receiver tunes to another PTC and, upon detection, recovers the desired program from the auxiliary channel conveyed therein.

In another embodiment of the invention, program content is embodied in a data-bearing signal comprising at least one carrier wave, the data bearing signal representing a plurality of packets for conveying program content for at least one primary channel and an auxiliary channel, wherein the auxiliary channel rebroadcasts lower resolution program content from other channels.

DETAILED DESCRIPTION

Other than the inventive concept, the elements shown in the figures are well known and will not be described in detail.

Also, familiarity with television broadcasting and receivers is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC) is assumed. Likewise, other than the inventive concept, transmission concepts such as eight-level vestigial sideband (8-VSB), Quadrature Amplitude Modulation (QAM), and receiver components such as a radio-frequency (RF) front-end, or receiver section, such as a low noise block, tuners, demodulators, correlators, leak integrators and squarers is assumed. Similarly, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements.

Figure 2:
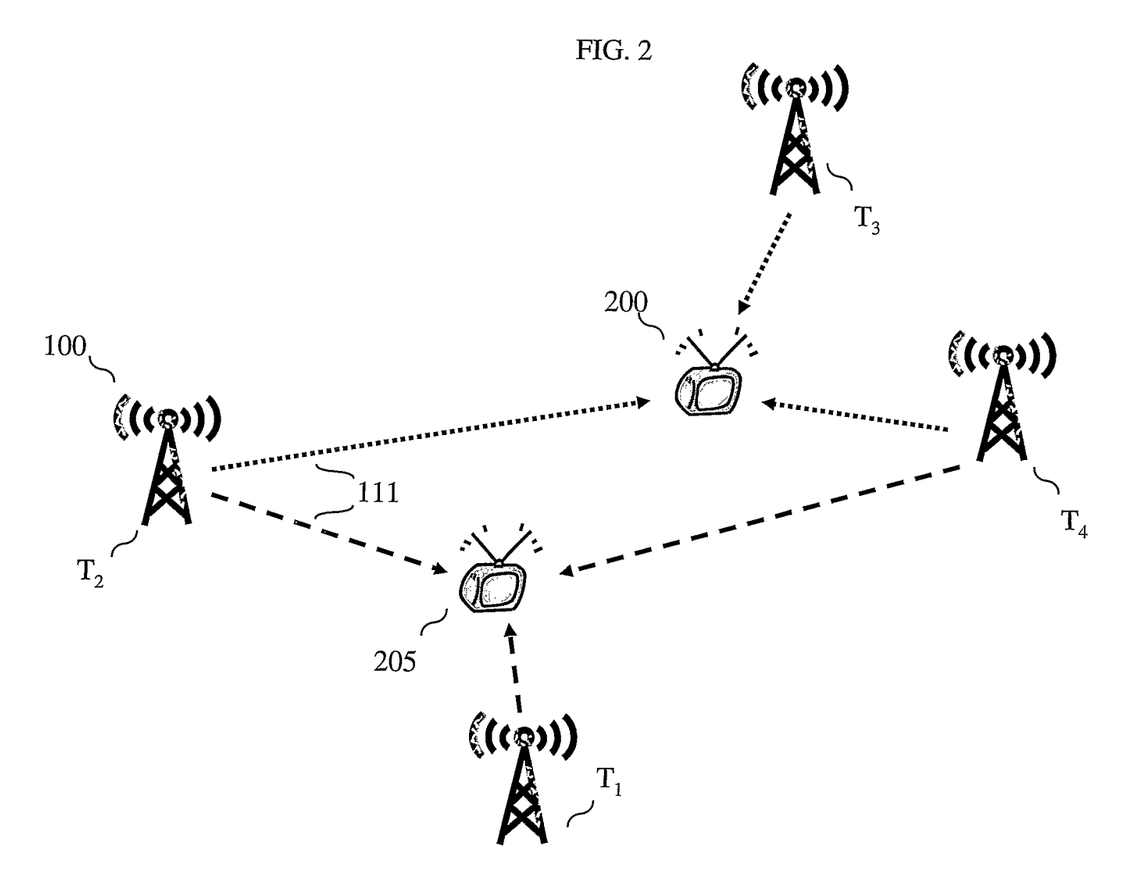
FIG. 2 illustrates terrestrial broadcast in accordance with the principles of the invention.

An illustrative arrangement for ATSC-DTV terrestrial broadcast in accordance with the principles of the invention is shown in FIG. 2. This figure is similar to FIG. 1 except that one, or more, of the transmission towers shown in FIG. 2 transmits a signal in accordance with the principles of the invention (described below). In this example, a transmitter 100 is associated with transmission tower $T_2$ for transmitting a signal 111 in accordance with the principles of the invention. The other transmission towers, $T_1$, $T_3$ and $T_4$ may, or may not, have similar transmitters in accordance with the principles of the invention. Similarly, receivers, as represented by TV sets 200 and 205, are adapted, in accordance with the principles of the invention, to take advantage of the transmitted signal to provide for robust reception. As can be observed from the dotted arrows of FIG. 2, TV set 200 is only able to receive a subset of the available channels, i.e., channels 2, 3 and 4. Reception for channel 1 is either too poor or nonexistent. Likewise, the dashed line arrows of FIG. 2 illustrate that TV set 205 is only able to receive channels 1, 2 and 4 for effective viewing of the content therein. TV set 205 is similar to TV set 200 (described below) and is not described further herein. For the purposes of this example, each transmission tower is illustratively associated with a particular TV provider, which transmits programming on a single channel. For example, transmission tower $T_1$ broadcasts programming for channel 1.1, transmission tower $T_2$ broadcasts programming for channel 2.1, transmission tower $T_3$ broadcasts programming for channel 3.1 and transmission tower $T_4$ broadcasts programming for channel 4.1, where each channel number uses the ATSC major-minor channel number format as known in the art. However, the invention is not so limited. For example, transmission tower $T_1$ may broadcast programming for more than one channel, e.g., channels 1.1, 1.2, etc. Similarly, a transmission tower may not be associated with a particular TV provider.

Figure 3:
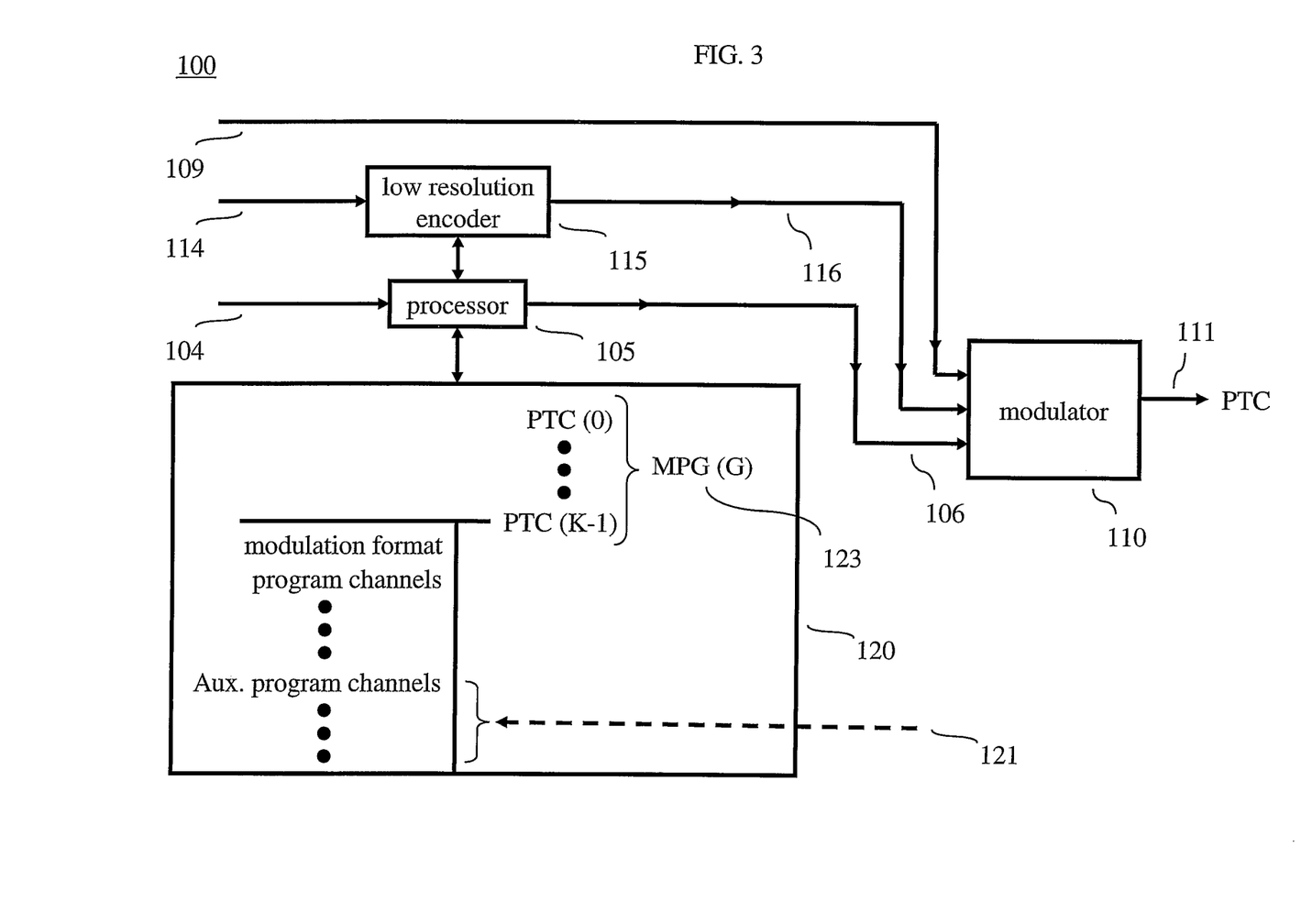
FIG. 3 shows an illustrative block diagram of a transmitter embodying the principles of the invention.
Figure 4:
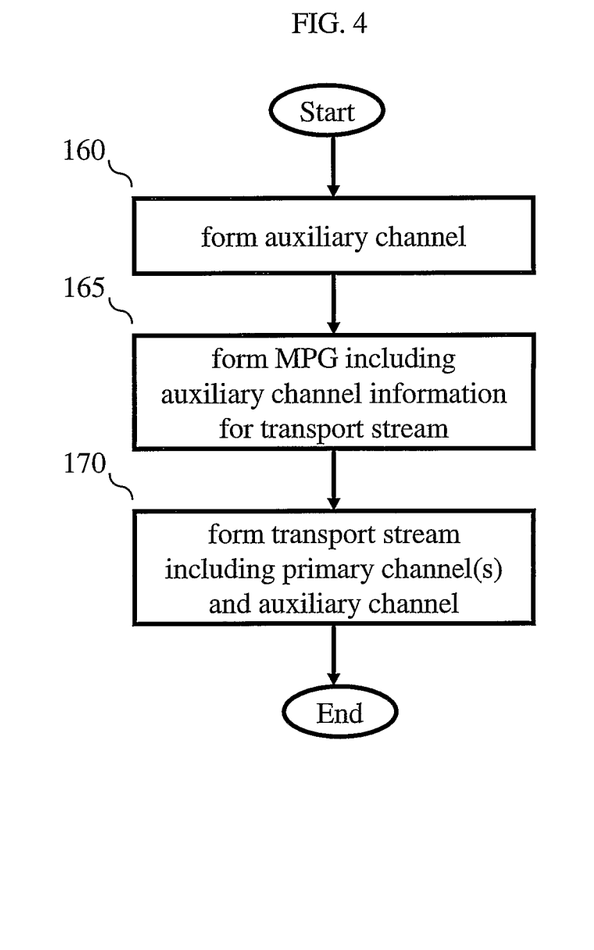
FIG. 4 shows an illustrative flow chart in accordance with the principles of the invention for use in the transmitter of FIG. 3.

Turning now to FIG. 3, an illustrative embodiment of transmitter 100 is shown. Other than the inventive concept, transmitter 100 forms an ATSC-DTV signal 111 for transmission via transmission tower $T_2$ of FIG. 2 as known in the art. Transmitter 100 comprises a modulator 110, a low resolution encoder 115, a memory 120 and a processor 105. The latter is representative of one or more microprocessors and/or digital signal processors (DSPs) and may include additional memory (not shown) for executing programs and storing data. In this regard, memory 120 is representative of memory in transmitter 100 and includes, e.g., any memory of processor 105 and/or modulator 110 and/or low resolution encoder 115. Reference at this time should also be made to FIG. 4, which shows an illustrative flowchart in accordance with the principles of the invention for use in transmitter 100.

In accordance with the principles of the invention, transmitter 100 forms an auxiliary channel in step 160. In particular, transmitter 100 receives programming content for each of the other channels, via signal 114, and encodes this program data at a lower resolution, via lower resolution encoder 115. The latter provides auxiliary channel data 116, which represents a statistically multiplexed data stream of lower resolution programs associated with other channels. In this example, programs for channels 1, 2, 3 and 4 of FIG. 2 are provided via auxiliary channel data 116, albeit at a lower resolution. It should be noted that lower resolution encoder 115 is representative of one, or more, encoders for providing lower resolution programming content. As such, other variations are possible. For example, transmitter 100 can comprise an array of lower resolution encoders, where each lower resolution encoder receives program content from one provider. In addition, each lower resolution encoder can use a different encoding or compression format. Alternatively, the auxiliary channel may be formed elsewhere and provided directly to transmitter 100 for rebroadcast as part of the PTC, etc. In step 165, processor 105 receives data related to each of the PTCs, PTC(0) through PTC(K−1), where K>0, via signal 104, and forms a "Master Program Guide" (MPG or G) 123 for storage in memory 120. Other than the inventive concept, processor 105 forms the MPG as known in the art (e.g., see "ATSC Standard: Program and System Information Protocol for Terrestrial Broadcast and Cable (Revision B)," Doc. A/65B, Advance Television Systems Committee, which, as such, is not described herein). As can be observed from FIG. 3, the MPG includes data, or information, for each of the PTCs as illustrated by the MPG data associated with PTC (K−1). The data associated with each PTC includes modulation format, etc., and data related to each of the M programs channels that are a part of a particular PTC. In addition, and in accordance with the principles of the invention, the MPG includes auxiliary program channel information 121, which includes program data and PID data similar to that found for each of the M program channels except that these relate to packets conveying lower resolution data and have different PIDs as formed in step 160. It should be noted that the value of M may be different for each PTC. It should also be noted that the MPG can be formed in other ways, e.g., data representing an MPG can be received by processor 105 from an external source such that transmitter 100 does not have to form the MPG.

Finally, in step 170, transmitter 100 forms a transport stream comprising a primary channel and the auxiliary channel. In particular, modulator 110 receives signals 109, 114 and 106 and forms a transport stream (or digital multiplex) as represented by PTC 111 of FIG. 3 for transmission via transmission tower $T_2$ of FIG. 2. Signal 109 represents a data stream for conveying one or more high definition TV (HDTV) channels offered by the TV provider associated with transmission tower $T_2$ as known in the art; signal 116 is the above-described auxiliary channel and signal 106 represents MPG 123. Modulator 110 provides PTC 111 at the appropriate carrier frequency, where, and in accordance with the principles of the invention, the transport stream includes a primary channel and an auxiliary channel.

Figure 5:
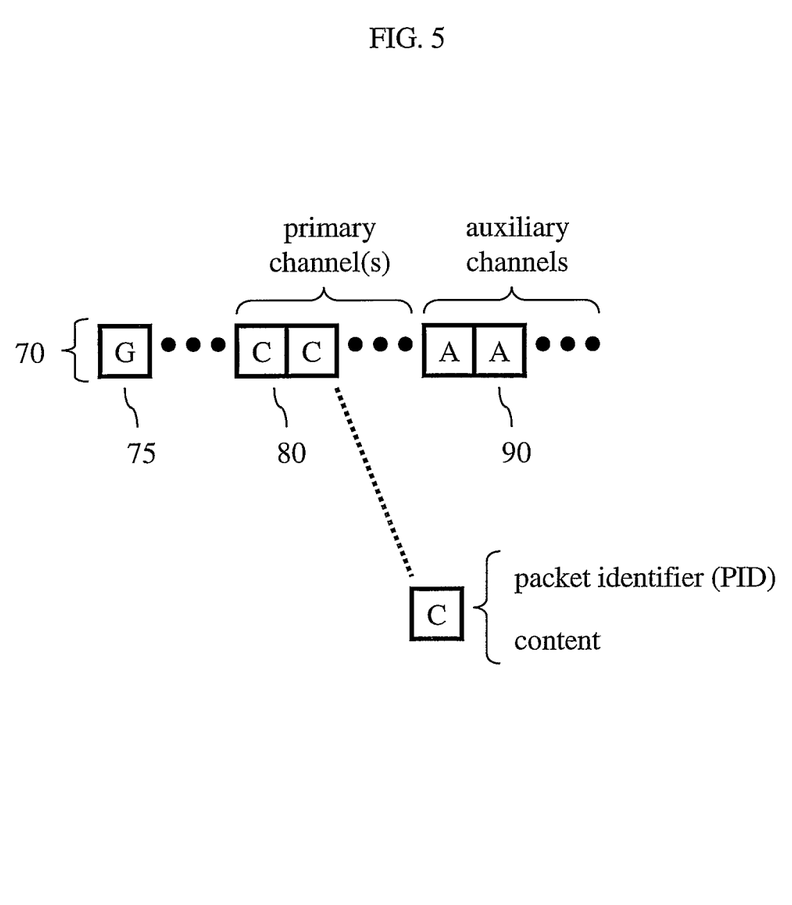
FIG. 5 shows a portion of an illustrative signal format in accordance with the principles of the invention.

Turning now to FIG. 5, an illustrative format for a PTC in accordance with the principles of the invention is shown. PTC 111 represents a data-bearing signal comprising at least one carrier wave (not shown), the data bearing signal representing a plurality of packets for conveying program content for at least one primary channel and an auxiliary channel, wherein the auxiliary channel conveys lower resolution program content from other channels. In particular, PTC 111 represents a stream of packets 70. The stream of packets includes at least one MPG (G) packet 75, at least one content (C) packet 80 and at least one auxiliary packet (A) packet 90. Each content packet 80 comprises a packet identifier (PID) and content (video, audio and/or data). For example, the content could relate to video and/or audio for a particular program channel, or even data representing an executable program being downloaded to receiver 300. In accordance with the principles of the invention, an auxiliary packet 90 represents lower resolution data for conveying programs at a lower resolution, where at least some of these programs are associated with channels transmitted by other ATSC-DTV transmitters. Illustratively, the content packets 80 convey HDTV signals.

Figure 6:
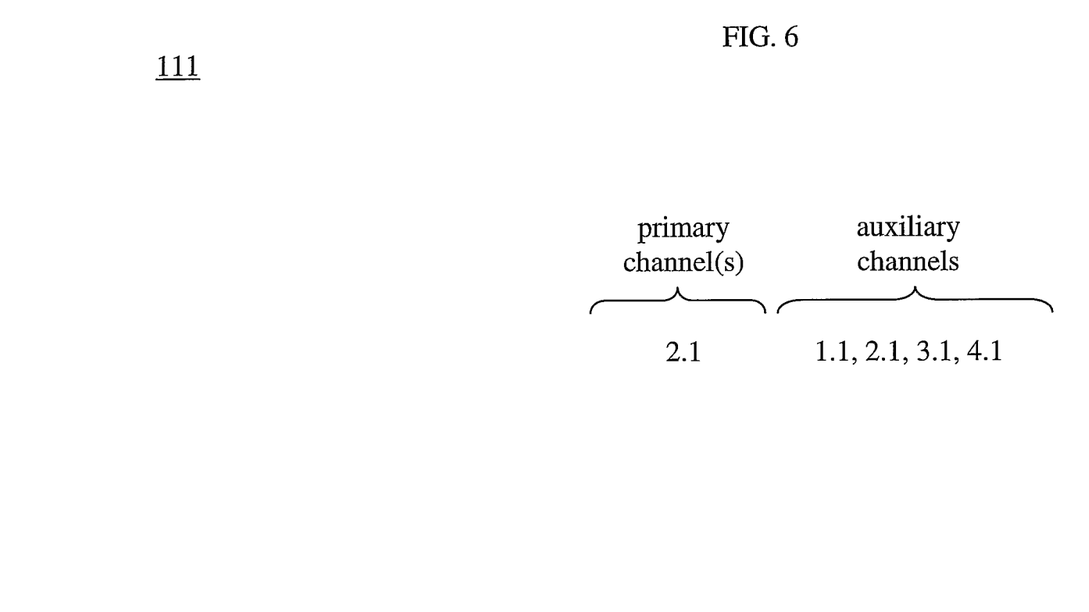
FIG. 6 shows an illustration of a primary channel and an auxiliary channel in the context of the terrestrial broadcast arrangement illustrated in FIG. 2.

Referring now to FIG. 6, this figure shows an illustration of a primary channel and an auxiliary channel in the context of the terrestrial broadcast arrangement illustrated in FIG. 2. As can be seen in FIG. 6, the primary channel for PTC 111 includes programming for a major-minor channel number 2.1; while the auxiliary channel includes programming for major-minor channel numbers 1.1, 2.1, 3.1 and 4.1. As noted earlier, the inventive concept is not so limited and, e.g., the primary channel can include other programming, e.g., for channels 2.1, 2.2, etc. Further, the auxiliary channel does not have to include a reduced resolution form of the primary channel for that transmitter (in this example, the auxiliary channel does not have to include 2.1).

In view of the above, a wireless system can provide improved coverage for a geographical area. If one assumes that there are N transmitters in a city, it is likely that (N–k; k>0), are reliably received by over 90% of the receivers in the field. If the providers agree to share any spare capacity on a PTC, then this spare capacity is allocated to the above-described auxiliary channel. As such, the auxiliary channel can convey one or more channels to improve coverage albeit at a reduced resolution. For example, it may be that only the providers associated with transmission towers $T_1$ and $T_2$ agree to share capacity. In this case, the above-described auxiliary channel transmitted by $T_2$ may only include the reduced resolution programming for $T_1$. For the example described above, if 3 Mbits/sec of spare capacity is available on a PTC, a station may choose to share 1 Mbit/sec (whether this is a constant bit rate or variable bit rate with 1 Mbit/sec being the average is up to the individual channels) on a reciprocal basis with three other stations ($T_1$, $T_2$ and $T_3$) to be carried within the auxiliary channel. In this case the remaining 2 Mbit/sec of spare capacity can be used to offer other services. It should be noted that spare capacity in a PTC can be created by restricting transmission of primary channels, e.g., selecting the number of primary channels such that the requisite amount of spare capacity is created in the PTC. An extreme example is the transmission of only one primary channel as represented in FIG. 6. Alternatively, advantage can be taken of improvements in both MPEG2 encoding and the introduction of advanced codec (coder/decoder) technology (such as H.264, which is also known as AVC (Advanced Video Coding) or MPEG-4 Part 10 or VC1) to create spare capacity in a PTC.

Figure 7:
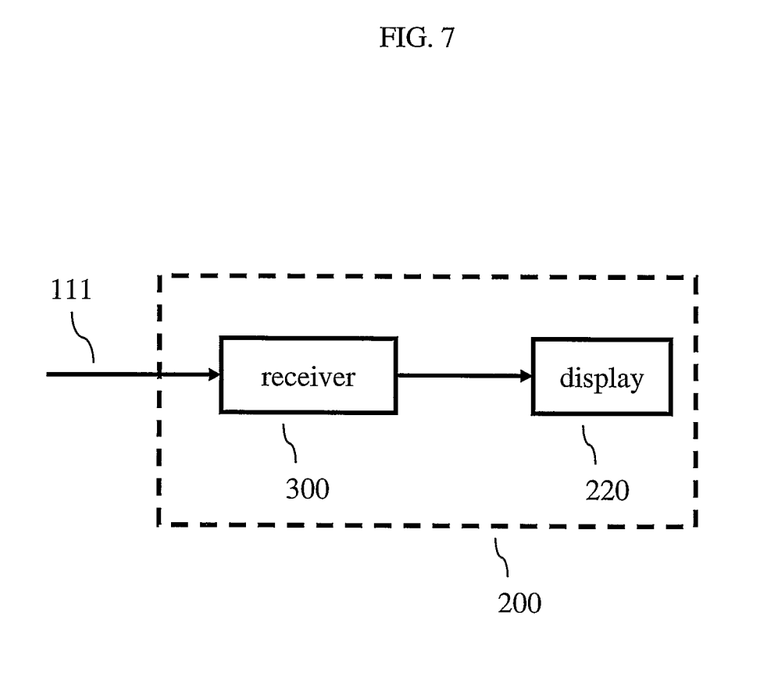
FIG. 7 shows an illustrative high-level block diagram of a receiver embodying the principles of the invention.

A high-level block diagram of an illustrative TV set 200 in accordance with the principles of the invention is shown in FIG. 7. TV set 200 includes a receiver 300 and a display 220. Illustratively, receiver 300 is an ATSC-compatible receiver. It should be noted that receiver 300 may also be NTSC (National Television Systems Committee)-compatible, i.e., have an NTSC mode of operation and an ATSC mode of operation such that TV set 200 is capable of displaying video content from an NTSC broadcast or an ATSC broadcast. For simplicity in describing the inventive concept, only the ATSC mode of operation is described herein. Receiver 300 receives a broadcast signal 111 (e.g., via an antenna (not shown)) for processing to recover therefrom, e.g., an HDTV (high definition TV) video signal for application to display 220 for viewing video content thereon.

Figure 8:
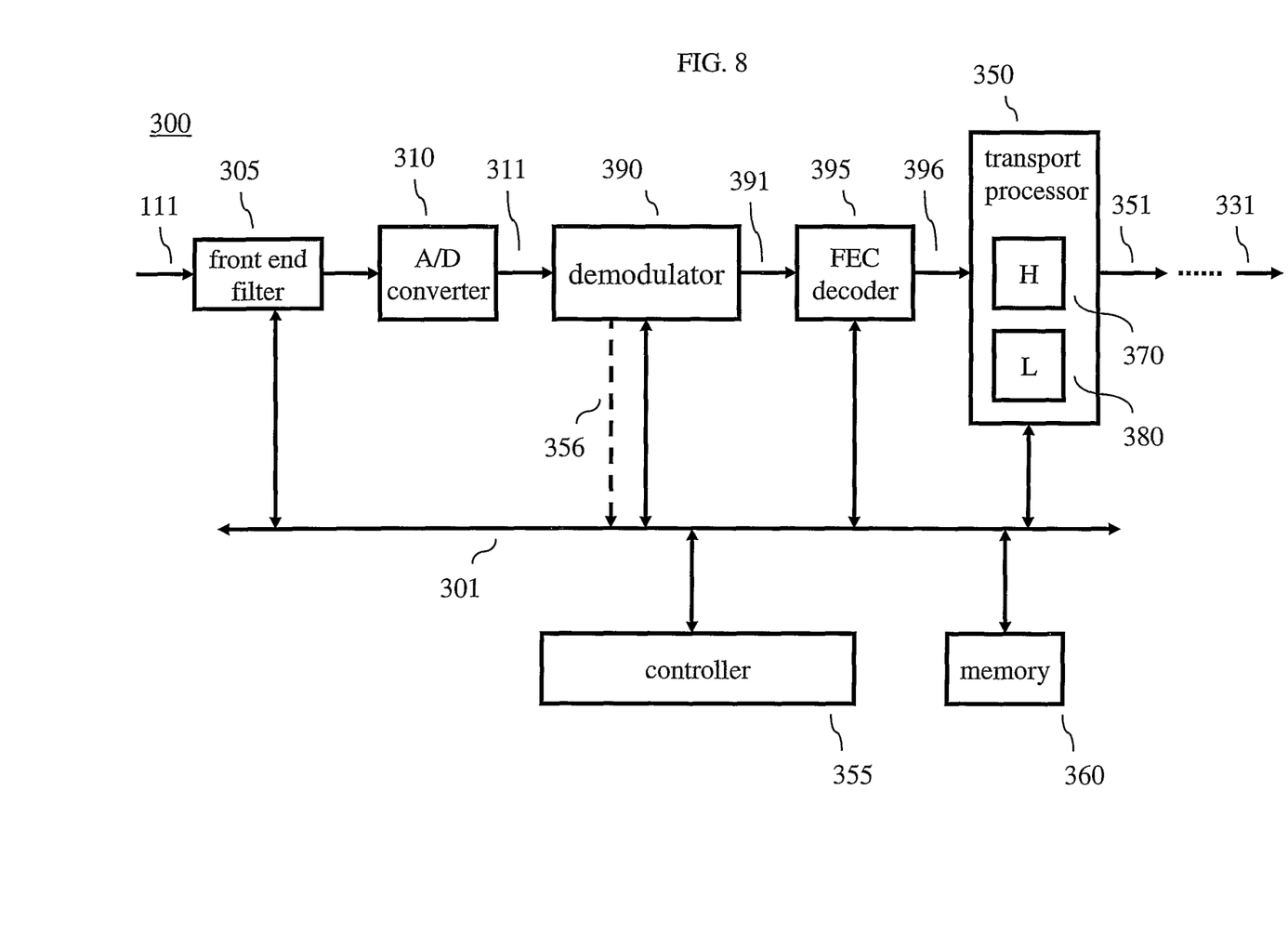
FIG. 8 show illustrative portions of a receiver embodying the principles of the invention.

In accordance with the principles of the invention, receiver 300 is also able to recover a low resolution signal for viewing if the reception for a selected channel is either too poor or non-existent. Turning now to receiver 300, an illustrative portion of receiver 300 in accordance with the principles of the invention is shown in FIG. 8. Receiver 300 includes front-end filter 305, analog-to-digital (A/D) converter 310, demodulator 390, forward error correction (FEC) decoder 395, transport processor 350, controller 355 and memory 360. Both transport processor 350 and controller 355 are each representative of one or more microprocessors and/or digital signal processors (DSPs) and may include memory for executing programs and storing data. In this regard, memory 360 is representative of memory in receiver 300 and includes, e.g., any memory of transport processor 350 and/or controller 355. An illustrative bidirectional data and control bus 301 couples various ones of the elements of FIG. 8 together as shown. Control bus 301 is merely representative, e.g., individual signals (in a parallel and/or serial form) may be used, etc., for conveying data and control signaling between the elements of FIG. 8. Front end filter 305 down-converts and filters received signal 111 to provide a near base-band signal to A/D converter 310, which samples the down converted signal to convert the signal to the digital domain and provide a sequence of samples 311 to demodulator 390. The latter performs demodulation of signal 311 and provides a demodulated signal 391, e.g., a sequence of signal points, to FEC decoder 395. The latter examines the inphase (I) and quadrature (Q) components of each of the signal points of demodulated signal 391 at the symbol rate, 1/T, and decodes the signal into a probable set of transmitted bits as represented by decoded signal 396. Decoded signal 396 is provided to transport processor 350, which distributes video, audio and data bits as represented by content signal 351 to appropriate subsequent circuitry (not shown). It should be noted that transport processor 350 illustratively includes a high resolution decoder (H) 370 and a low resolution decoder (L) 380. In this regard, receiver 300 may additionally process the content before application to display 220 and/or directly provide the content to display 220, via signal 331. It should be noted that location of the high resolution and low resolution decoders in transport processor 350 is not required. It should also be noted that receiver 300 may receive commands, e.g., program selection, via a remote control (not shown).

Figure 9:
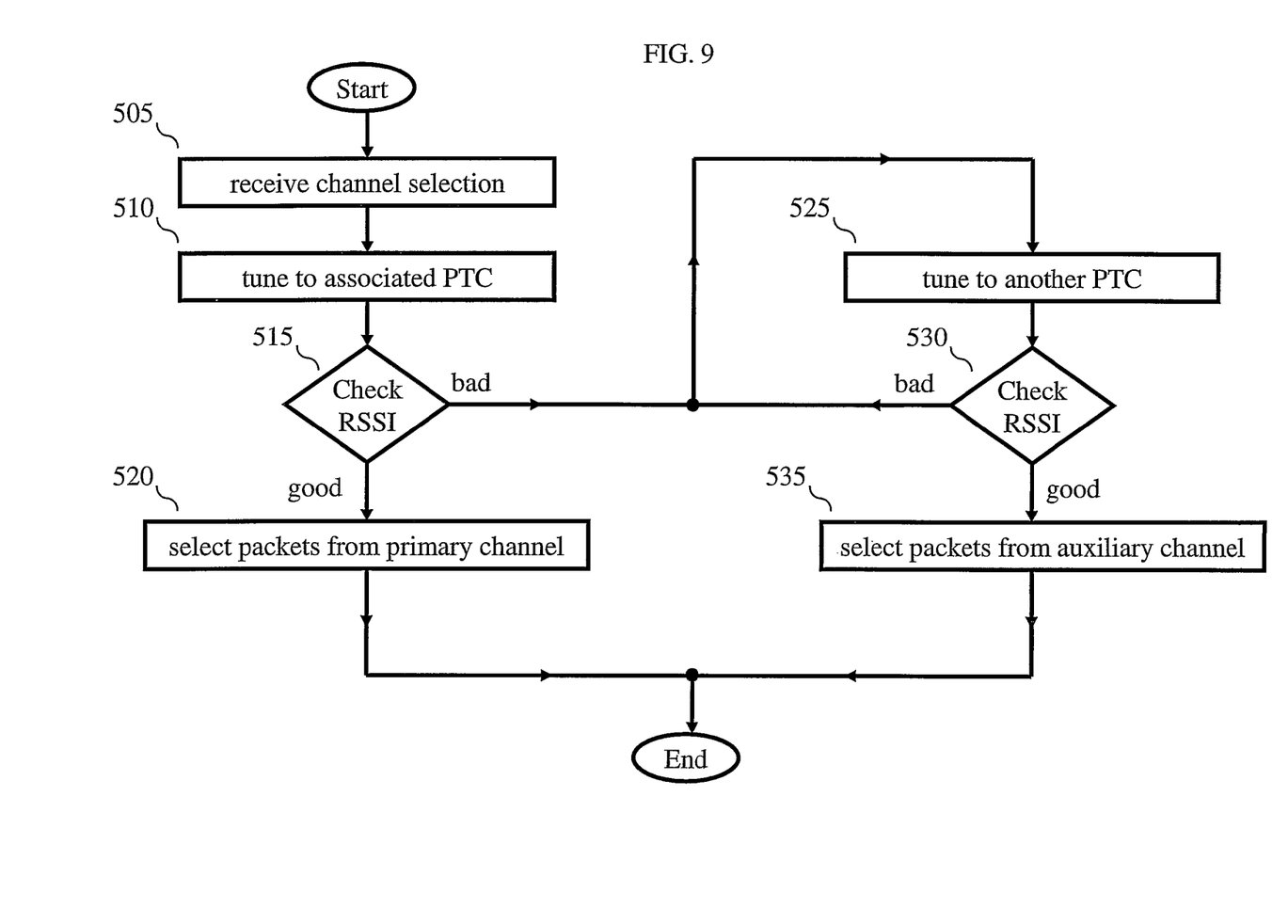
FIG. 9 shows an illustrative flow chart for use in a receiver in accordance with the principles of the invention.

To get an appreciation of the benefits of the inventive concept, attention should now be directed to FIG. 9, which shows an illustrative flow chart for providing for a more robust reception of wireless signals in a receiver. For the purposes of this example, it is assumed that receiver 300 has already received a form of the above-described MPG. Other than the inventive concept, use of an MPG by a receiver to tune to channels therein is known in the art. For example, see U.S. Pat. No. 6,366,326 issued Apr. 2, 2002 to Ozkan et al. and/or U.S. Pat. No. 5,946,052 issued Aug. 31, 1999 issued to Ozkan et al. As such, searching for, and acquisition of, an MPG is not described herein.

In step 505, receiver 300 (e.g., controller 355) receives a channel selection from a user (not shown), e.g., via the abovementioned remote control. In step 510, receiver 300 (e.g., controller 355) uses information from the acquired MPG (via memory 360) to tune to the PTC associated with that channel. In particular, front end filter 305 is tuned to the PTC via control bus 301. In step 515, receiver 300 (e.g., controller 355) checks the received signal strength indicator (RSSI) via signal 356 of FIG. 8. If the RSSI value is equal to, or above, a predetermined value, e.g., −75 dBm (decibels referenced to one milliwatt), then reception should be good and receiver 300 selects packets from the primary channel of the PTC in accordance with the PID information from the acquired MPG in step 520 (e.g., via controller 355, transport processor 350 and high resolution decoder 370). Video content from the selected packets are then provided to display 220 (this step is not shown in FIG. 9). However, if the RSSI value is below the predetermined value, then reception is determined to be bad. In this case, receiver 300 (e.g., controller 355) in accordance with the principles of the invention, attempts to locate an auxiliary channel for recovery of the content for the selected channel. In particular, receiver 300 tunes to another PTC in step 525 and again checks the RSSI value in step 530. If reception is bad, receiver 300 continues to check available PTCs as indicated in the acquired MPG. If no PTC is eventually acquired, an error message is generated (not shown in FIG. 9). However, once a PTC is found with good reception, execution proceeds to step 535. In this step receiver 300 selects packets from the auxiliary channel of the acquired PTC in accordance with the PID information from the acquired MPG in step 520 for the selected channel (e.g., via controller 355, transport processor 350 and low resolution decoder 380). Video content from the selected packets are then provided to display 220 (this step is not shown in FIG. 9) so that the user can view the desired program, albeit in a lower resolution.

A described above, and in accordance with the inventive concept, a robust transmission and reception method is described for a system having multiple originating sources and multiple destinations (receivers or sinks). Indeed, the above-described inventive concept can be described as a form of spatial diversity. For example, in the illustrative embodiment above, the ATSC-DTV system of FIG. 2 incorporated spatial diversity in accordance with the principles of the invention.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements of may be implemented in a stored-program-controlled processor, e.g., a digital signal processor, which executes associated software, e.g., corresponding to one or more of the steps shown in, e.g., FIGS. 4 and/or 9, etc. Further, although shown as elements bundled within TV set 200, the elements therein may be distributed in different units in any combination thereof. For example, receiver 300 of FIG. 7 may be a part of a device, or box, such as a set-top box that is physically separate from the device, or box, incorporating display 220, etc. Also, it should be noted that although described in the context of terrestrial broadcast (e.g., ATSC-DTV), the principles of the invention are applicable to other types of communications systems, e.g., satellite, Wi-Fi, cellular, etc. Indeed, even though the inventive concept was illustrated in the context of stationary receivers, the inventive concept is also applicable to mobile receivers. It is therefore to be understood that numerous modifications may be made to the illustrative embodiments and that other arrangements may be devised without departing from the spirit and scope of the present invention as defined by the appended claims.

The invention claimed is:

1. A method for use in a receiver, the method comprising:
    determining if the receiver is in an area of poor, or no, reception for a first physical transmission channel (PTC) conveying a first primary channel and a first auxiliary channel, the first primary channel conveying programming of a selected TV channel;
    if the receiver is in an area of poor, or no, reception for the first PTC, tuning to a second PTC conveying a second primary channel and a second auxiliary channel, the second auxiliary channel conveying the programming of the selected TV channel; and
    recovering video for the selected TV channel from the second auxiliary channel conveyed in the second PTC, wherein the second auxiliary channel conveys the programming of the selected TV channel in a lower resolution than it is conveyed in the first primary channel of the first PTC.

2. The method of claim 1 wherein the first primary channel conveys at least one high definition TV (HDTV) channel.

3. The method of claim 1 wherein the first primary channel represents an ATSC-DTV (Advanced Television Systems Committee-Digital Television) signal.

4. The method of claim 1 wherein determining if the receiver is in an area of poor, or no, reception for the first PTC includes comparing a received signal strength indicator (RSSI) to a predetermined value and if the RSSI is not above the predetermined value, determining that the receiver is in an area of poor, or no, reception for the first PTC.

5. A receiver, the receiver comprising:
    a front end filter for tuning to one of a number of physical transmission channels (PTCs);
    a processor for controlling the front end filter to tune to a first PTC, the first PTC conveying a first primary channel and a first auxiliary channel, the first primary channel conveying programming of a selected TV channel;
    wherein the processor determines if the receiver is in an area of poor, or no, reception for the first PTC and, if the receiver is in an area of poor, or no, reception for the first PTC, the processor controls the front end filter to tune to a second PTC conveying a second primary channel and a second auxiliary channel, the second auxiliary channel conveying the programming of the selected TV channel for recovering video for the selected TV channel from the second auxiliary channel conveyed in the second PTC, wherein the second auxiliary channel conveys the programming of the selected TV channel in a lower resolution than it is conveyed in the first primary channel of the first PTC.

6. The receiver of claim 5 wherein the first primary channel conveys at least one high definition TV (HDTV) channel.

7. The receiver of claim 5 wherein the first primary channel represents an ATSC-DTV (Advanced Television Systems Committee-Digital Television) signal.

8. The receiver of claim 5 wherein the processor determines if the receiver is in an area of poor, or no, reception for the first PTC by comparing a received signal strength indicator (RSSI) to a predetermined value and if the RSSI is not above the predetermined value, determining that the receiver is in an area of poor, or no, reception for the first PTC.

* * * * *